United States Patent
Link, II (10) Patent No.: US 9,671,934 B2
(45) Date of Patent: *Jun. 6, 2017

(54) REMOVABLE MODULAR UNIVERSAL TELEMATICS SERVICES ENGINE FOR AN AUDIO-VISUAL CONTROL UNIT

(71) Applicant: VERIZON TELEMATICS INC., Atlanta, GA (US)

(72) Inventor: Charles M. Link, II, Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 731 days.

This patent is subject to a terminal disclaimer.

(21) Appl. No.: 14/054,714

(22) Filed: Oct. 15, 2013

(65) Prior Publication Data

US 2014/0047336 A1 Feb. 13, 2014

Related U.S. Application Data

(63) Continuation of application No. 12/794,582, filed on Jun. 4, 2010, now Pat. No. 8,589,793.

(60) Provisional application No. 61/184,277, filed on Jun. 4, 2009.

(51) Int. Cl.
*G06F 3/0484* (2013.01)
*B60K 35/00* (2006.01)

(52) U.S. Cl.
CPC ............ *G06F 3/0484* (2013.01); *B60K 35/00* (2013.01); *B60K 2350/357* (2013.01)

(58) Field of Classification Search
CPC ...... H04M 1/6091; B60K 35/00; B60R 11/02; G06F 17/30017
USPC ............................ 715/716, 717, 810; 381/86
See application file for complete search history.

(56) References Cited

U.S. PATENT DOCUMENTS

| | | | |
|---|---|---|---|
| 6,407,733 B1 | 6/2002 | Kawakami | |
| 6,407,750 B1 | 6/2002 | Gioscia et al. | |
| 7,076,349 B2 | 7/2006 | Davidson et al. | |
| 8,175,288 B2 | 5/2012 | Lengeling et al. | |
| 8,306,739 B2 | 11/2012 | Miller | |
| 2004/0110472 A1* | 6/2004 | Witkowski | G07C 5/008 455/41.2 |
| 2007/0226734 A1 | 9/2007 | Lin et al. | |
| 2008/0077882 A1* | 3/2008 | Kramer | B60K 35/00 715/810 |
| 2008/0141119 A1 | 6/2008 | Suda | |

(Continued)

*Primary Examiner* — Andrew Tank (57) ABSTRACT

Modular auxiliary processor circuitry, capable of performing telematics services, including wireless communications, diagnostic assessment and reporting, location based services, and internetworking, couples with a vehicle head unit through an auxiliary processing module interface. When so coupled, the auxiliary processing module circuitry can perform tasks, services, functions, and aspect that a lower-capability processor of the head unit cannot perform as quickly or as efficiently, if at all. When the auxiliary processor module is coupled and active, its display output can couple to a display device either permanently fixed in the vehicle, or portable and mobile with respect to the vehicle, through conductors or a wireless link. When the auxiliary processor circuitry's output couples to the display device, software running on the head unit, or the auxiliary processor module, may decouple the head unit from the display device unless a user interface requests its services, such as tuning an AM/FM radio circuit.

20 Claims, 4 Drawing Sheets

(56) References Cited

U.S. PATENT DOCUMENTS

2009/0005080 A1* 1/2009 Forstall .................. H04W 4/02
455/456.3
2009/0289113 A1 11/2009 Vilnai et al.

* cited by examiner

REMOVABLE MODULAR UNIVERSAL TELEMATICS SERVICES ENGINE FOR AN AUDIO-VISUAL CONTROL UNIT

CROSS REFERENCE TO RELATED APPLICATION

This application is a continuation of and claims priority under 35 USC sec. 120 to U.S. patent application Ser. No. 12/794,582, which claims priority under 35 USC sec. 119 to U.S. Provisional Patent Application No. 61/184,277 that has a filing date of Jun. 4, 2009, and incorporates both herein by reference in their entireties.

SUMMARY

Figure 4:
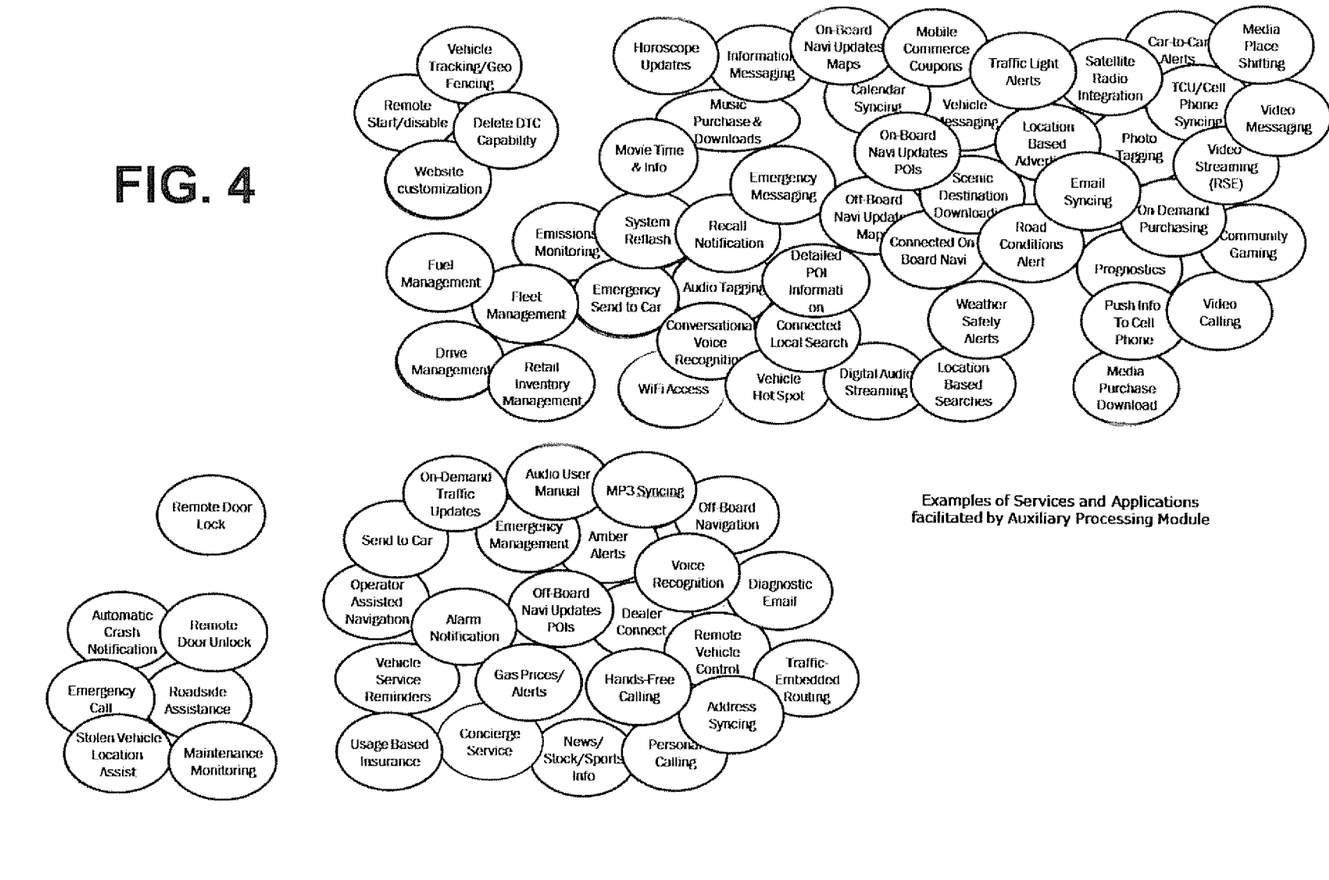
FIG. 4 Illustrates a diagram of examples of features and services that an auxiliary processing module can facilitate.

An auxiliary processing module supplements the processing capabilities of a basic processor of an audio-visual control unit having relatively low processing capability. The audio-visual control unit may be part of a 'head unit'. By using a simple and basic processor in the audio-visual control unit, power consumption, costs, and most likely operational problems are reduced compared to a head unit with an advanced processor that can run complex applications, programs, and facilitate services. For example, applications that enable features such as navigation, video processing, internet browsing, can be performed by the auxiliary processor, while the less expensive and more basic processor of the head unit can perform basic AM/FM and CD processing functions, as well as running a basic application that allows a user to select features that the auxiliary processing module supports. FIG. 4 shows some examples of features and services that the auxiliary processing module can facilitate, accommodate, and support. However, one skilled in the art will appreciate that an auxiliary processing module can support, facilitate, accommodate, and process many other features, services, and aspects in addition to those shown in the diagram of FIG. 4.

In addition, as processors (e.g., microprocessors) evolve and become more and more powerful (capable of executing more and more instructions per second, and managing more and more applications and devices, etc.) a user can purchase new auxiliary processing modules that support more and more features without having to replace the head unit. Thus, a vehicle manufacturer can reduce the base initial cost of a vehicle (e.g., a buyer does not purchase an auxiliary processing module at the time of purchasing the vehicle) and the vehicle user has the ability to add processing functionality to the vehicle's head unit (that includes a graphical display device) as he or she chooses to by purchasing an auxiliary processing module that interoperates with the head unit.

The auxiliary processing module may include processor and related circuitry mounted and connected together on a circuit board. The circuit board may have contacts that interface with complementary contacts of an auxiliary module interface, such as a slot or an electrical connector. The slot, or electrical connector, may be part of the head unit/audio-visual control unit, part of a cable assembly coupled to the head unit, part of a device that connects to the head unit via, a wireless connection, integrated into the dashboard of a vehicle and coupled to the head unit, or otherwise provide connectivity to the processor of the head unit.

Switching means, examples of which may include a multiplexer, a digital video selector, one or more relays, and a switch, process and/or route signals destined to a display device. The multiplexer or signal selector can electronically, and digitally determine, which data and information signals, or packets, get forwarded to the display device and which ones do not. Thus, an application running on the head unit, or on the auxiliary processor module, interoperates with the switching means to couple either the processor of the audio-visual control unit/head unit, or an auxiliary processing module inserted into a slot or connector or connected wirelessly to the audio-visual control unit, the a shared display device in response to a user selection or in response to an automatic detection of the presence of an auxiliary processing module. In addition, a relay can physically switch the signals that get forwarded to a display device between signals from the audio-visual control unit and an auxiliary processing module in response to a user select. The user may select the signals or packets that the display devices receives either from a software graphical user interface; physical buttons, knobs, sliders, or other haptic interface means; which can control the operation of the switching means to process or route the signals accordingly.

DETAILED DESCRIPTION

As a preliminary matter, it will be readily understood by those persons skilled in the art that the present aspects are susceptible of broad utility and application. Many methods, embodiments, aspects, and adaptations other than those herein described, as well as many variations, modifications, and equivalent arrangements, will be apparent from or reasonably suggested without departing from the substance or scope described herein.

Accordingly, while a detailed description in relation to preferred embodiments has been given, it is to be understood that this disclosure is only illustrative and exemplary and is made merely for the purposes of providing a full and enabling disclosure. The following disclosure is not intended nor is to be construed to limit or to exclude other embodiments, adaptations, variations, modifications and equivalent arrangements, the present invention being limited only by the claims appended hereto and the equivalents thereof.

Figure 1:
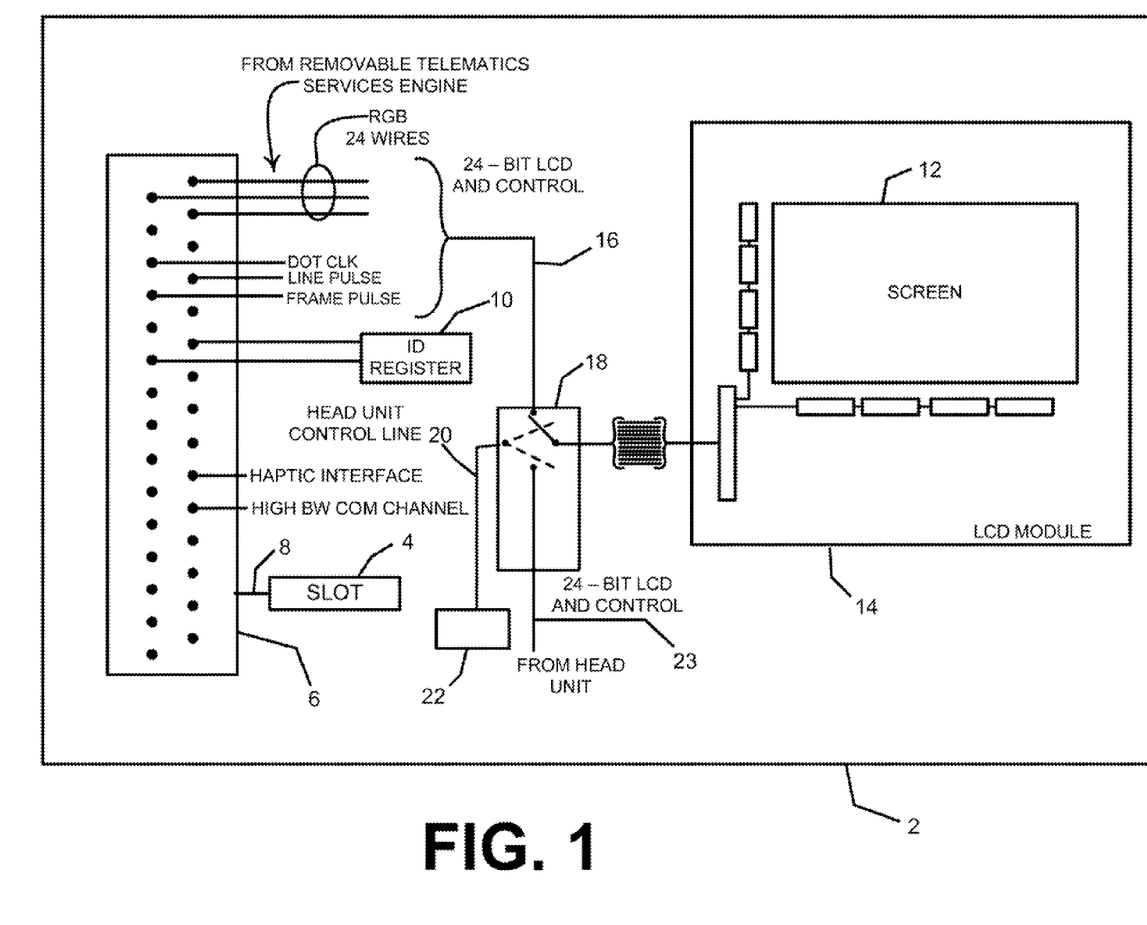
FIG. 1 illustrates a block diagram of a portion of an audio-visual control unit that includes an auxiliary processing module interface.

FIG. 1 illustrates a portion of an audio-visual control unit 2, which may be referred to as a vehicle head unit, that includes an auxiliary processing module interface 4, which may include a slot, for receiving a removable auxiliary processing module. In an aspect, the auxiliary processing module can include a universal telematics services engine, which may also be referred to as a telematics control unit ("TCU") on a card. Slot 4 includes contacts, which may include pins, that interface with complementary contacts of TCU card and connect to a connector 6 via a ribbon cable 8. Alternatively, the connector and slot can be formed into a single article. Regardless of whether formed into one article, or from two separate articles and coupled via ribbon cable 8, the electrical contacts of connector 6 couple to various circuits in audio-visual control unit 2, either via another ribbon cable, or via electrical traces if directly mounted to a circuit board of the audio-visual control unit. It will be appreciated that circuitry of the auxiliary processing module may be contained on an integrated circuit chip, and the auxiliary processing module interface may include a socket for receiving pins of the chip.

With the auxiliary processing module, or TCU card, plugged into slot 4, the auxiliary processing module reads information from ID register 10. ID register 10 typically contains information, such as, for example, the screen resolution of screen 12, values for various interface parameters of LCD module 14, which could include the screen resolution of screen 12, as well as voltage levels to drive the screen, the number of bits that can drive each pixel, etc. Once the auxiliary processing module reads information from ID register 10, the module configures itself by adjusting a graphics engine (which may include graphics processing circuitry as well as graphics processing software and firmware) onboard the module to output information to LCD module 14 and screen 12 based on the information read from the ID register.

Multiple RGB wires 16 from connector 6 carry graphic and image signals received from the auxiliary processing module to multiplexer 18. Multiplexer 18 responds to a control signal on control line 20. Control line 20 carries control signals from other circuitry in audio-visual control unit 2, namely processor 22 of the audio-visual control unit. Software running on audio-visual control unit 2 can configure processor 22 so that when no TCU card, or other auxiliary processing module, is in slot 4, multiplexer 18 is configured to forward graphic and image signals on wires 16 to module 14 (as shown in FIG. 1 by the solid line connecting cable 16 to module 14). But, when an auxiliary processing module is installed in slot 4, processor 22 may automatically configure multiplexer 18 to forward graphic and image signals from the auxiliary processing module instead (the figure does not show this scenario, which would show the solid line connecting signals represented by line 23 from the audio-visual control unit to LCD module 14). Thus, a vehicle may be delivered to a customer without an auxiliary processing module, for example a telematics control unit, installed in it, but the customer may later add such a unit to his vehicle by purchasing a TCU card at a dealer, or through an aftermarket channel.

Figure 2:
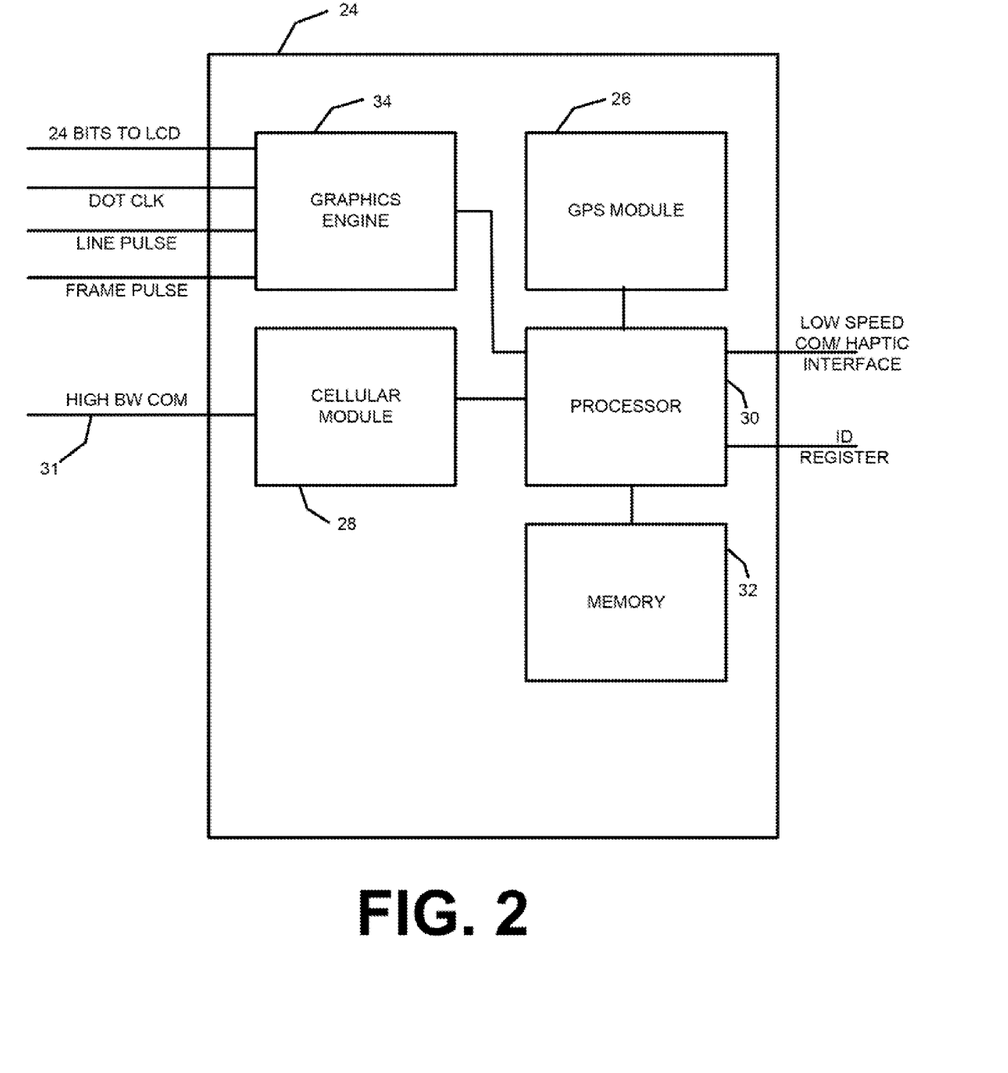
FIG. 2 illustrates a block diagram of an auxiliary processing module that includes TCU features, aspects, and processing.

FIG. 2 shows an aspect where the auxiliary processing module includes TCU features, aspects, and processing, on a TCU card 24. A TCU card typically contains connector contacts for providing an electrical coupling with complementary contacts of slot 4. As discussed above, slot 4 may be incorporated into audio-visual module 2, or may couple to it via a cable, such as a ribbon cable. Signal lines emanating from auxiliary processor module 24 shown in FIG. 2 correspond to contacts represented by similarly labeled signals lines coupled to complementary contacts of connector 6 as shown in FIG. 1.

Continuing with the discussion of FIG. 2, GPS module 26, cellular module 28, and processor 30 are shown coupled together. Memory 32 may comprise both volatile and nonvolatile portions, and couples to processor 30. In addition, graphics engine 34 couples to processor 30. Other embodiments may be implemented with respect to how the various components are coupled together and to the card's connector contacts that mate with complementary contacts of interface/slot 4 shown in FIG. 1. For example, a connector coupled to High BW Signal line 31, which corresponds to the High Bandwidth communication channel contact shown in FIG. 1, may couple with processor 30 rather than cellular module 28. In fact, some or all of components 26, 28, 30, and 34 may couple to a bus rather than discretely to one another as shown in FIG. 2.

Continuing with the description of FIG. 2, making graphics engine 34 part of auxiliary processing module/TCU card 24 reduces the cost of head unit 2, by eliminating the graphics components therefrom. In addition, by configuring the audio-visual control unit to perform routine processing related, to operating AM/FM and CD music circuits, and displaying information related thereto, advanced features such as cellular processing, end user application programs, and other processor intensive operation can be performed by processor 30 of the auxiliary module 24. By relegating processor 22 shown in FIG. 1 to the AM/FM, CD, and possibly haptic interface processing operations, the cost of audio-visual control unit 2 can be reduced by using a relatively low-cost/low performance processor compared to processor 30, or by using processing that may be performed by cellular module 28.

When a vehicle owner purchases an auxiliary processing module, such as a TCU card 24, the first time the card is installed into slot 4, the TCU card reads information not only from the ID register, but also from one of the vehicle's onboard computer modules, typically the engine control module, which is often the master computer control module for a given vehicle. When TCU card 24 reads ID register 10 and the onboard computer module for the first time, it reads the vehicle's vehicle identification number ("VENT") and embeds the VIN in a nonvolatile memory portion of memory 32. To prevent fraud, this VIN information stored in memory 32 cannot be overwritten, except using specially authorized software at a dealer, for example, or by returning to the OEM manufacturer. In an aspect, the dealer or manufacturer may provide a code for the owner of the auxiliary processing module to use to modify the memory content to store VIN information corresponding to multiple vehicles.

In an aspect, telematics services that a driver pays for may be (if a driver purchases services from the vehicle during a current session), or may have been (if a buyer subscribes to services when purchasing the vehicle or at another time with a computer remote from the vehicle), associated at a central computer system, for example a services provider's telematics operations center ("TOC") server, with the VIN that has been stored in memory 32. Thus, a driver cannot obtain more services from a telematics services provider than he pays for (e.g. a user cannot use more services than are currently associated with the vehicle's VIN In addition, a thief that steals a TCU card cannot obtain services in another vehicle. Each time an audio-visual control unit, or head unit, is powered up and the TCU card communicates with the vehicle's computer system, the TCU card compares the stored VIN to the VIN read from the vehicle. If they do not match, an application running on the TCU sends a notice to the telematics services provider, and perhaps to a law enforcement agency too. It will appreciated that instead of an application running on the TCU, an application running on the audio-visual control unit may perform the comparing of the stored VIN with the VIN information retrieved from the bus.

However, a driver may remove an auxiliary processing module/TCU card 24 from slot 4 in the audio/visual control unit/head unit and install it into a cradle/dongle coupled to a computer, for example. Through the cradle, the driver can access a telematics services provider's web site through the computer's browser connected to the internet, and update telematics services that the TCU can provide.

In an aspect, a subscriber to telematics services may obtain a code from a dealer or a vehicle manufacturer that permits using the auxiliary processing module in a different vehicle by either erasing VIN information stored in the auxiliary processing module's memory, or by adding information related to one or more additional VINs to the auxiliary processing modules memory. Thus, when the comparison between stored and retrieved VIN information is performed, as long as a match occurs between the retrieved VIN information and one of the stored VINs, the auxiliary processing module will be permitted to operate.

Figure 3:
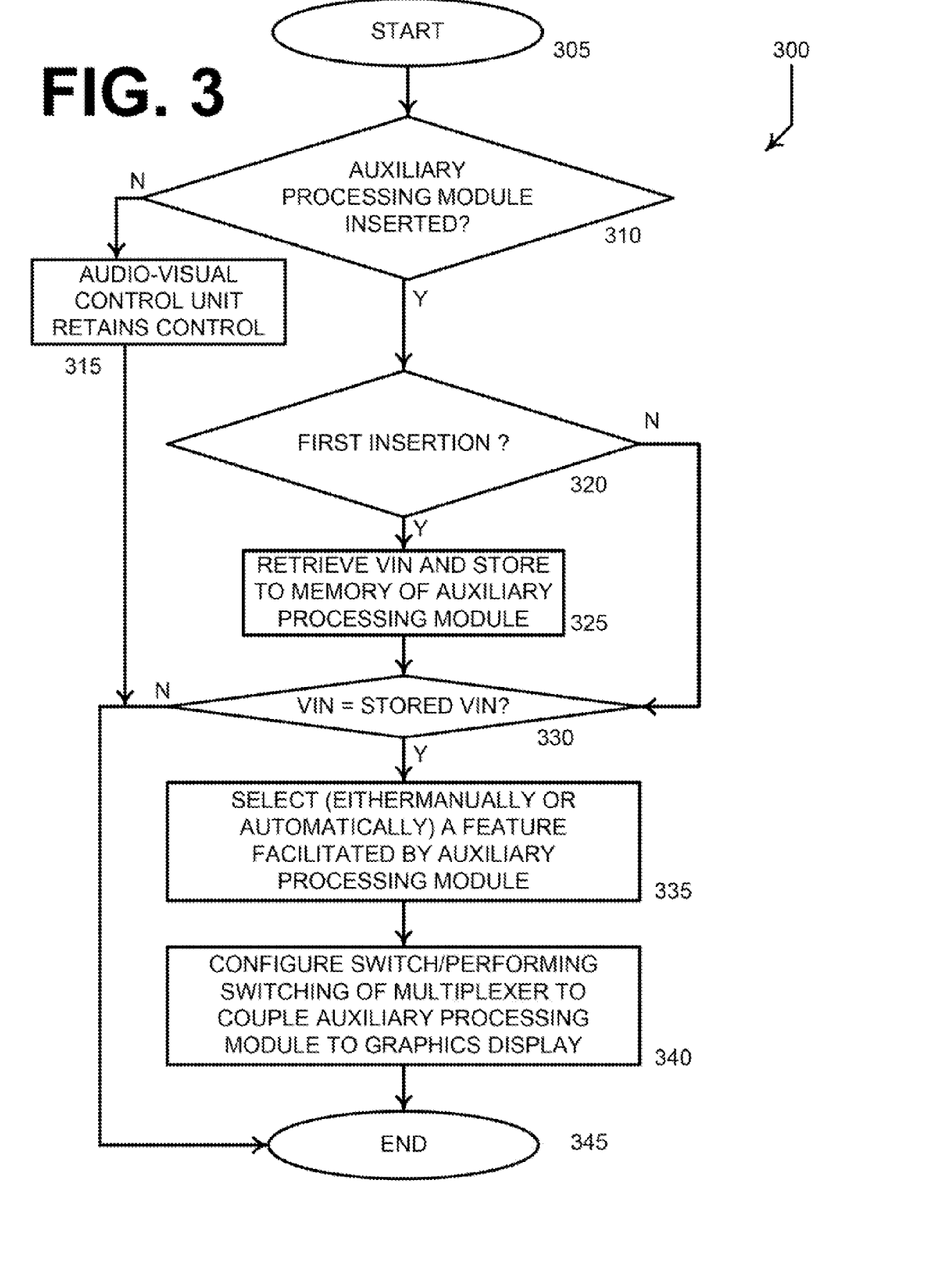
FIG. 3 illustrates a flow diagram of a method for using a removable processing module.

Turning now to FIG. 3, the figure illustrates a flow diagram of a method 300 for using a removable auxiliary processing control module to supplement, or supplant, the processor of an audio-visual control unit in a vehicle. Method 300 starts at step 305. At step 310, an application running on an audio-visual control unit, such as a head unit, determines whether an auxiliary processing module has been inserted into a slot coupled to the audio-visual control unit. If an auxiliary processing module has not been inserted (e.g., inserted means that the circuitry has been removably coupled with a processor of the audio-visual control unit) into the slot, or otherwise removably coupled to the audio-visual control unit (e.g., wireless link), at step 315 a processor of the audio-visual control unit retains control of, and connectivity with, a graphical display device coupled with the audio-visual control unit. After step 315, method 300 ends at step 345.

If, however, insertion, or coupling, of an auxiliary processing module is detected at step 310, method 300 advances 10 step 320. At step 320, a determination is made whether the insertion, or coupling, is the first insertion, or coupling, of the auxiliary processing module with the audio-visual control unit. If the determination at step 320 is 'Y', or yes, at step 325 the application running on the audio-visual control unit retrieves the vehicle's VIN in a digital form from the ECM, and passes it to the auxiliary processing module, a processor of which stores the VIN information to a memory. After storing the VIN information to memory of the auxiliary processing module, method 300 advances to step 330.

Returning to step 320, if the determination is made that the insertion, or coupling, is not the first insertion, or coupling, of the auxiliary processing module with the audio-visual control unit, then method 300 skips step 325 and advances to step 330.

At step 330, the processor requests that the application running on the processor of the audio-visual control unit retrieve the VIN in digital format from the ECM of the vehicle. The processor of the auxiliary processing module then compares the just-retrieved and received VIN information with the VIN information stored at step 325. If the result of the comparison at step 330 is 'N', or No, indicating a mismatch of VIN information, the auxiliary processing module generates an error message and passes it to the audio-visual control unit for display on a coupled display device. The auxiliary processing module may also wirelessly send a notification that a VIN mismatch occurred to a telematics services provider, or to a law enforcement agency, or both. In addition, if wireless connectivity is not currently enabled for the auxiliary processing module, it may transmit the notification message(s) via the internet when, and if, the auxiliary processing module is connected to the internet via a dongle, or other similar method, such as Bluetooth, for connecting to the internet. After step 330, method 300 ends at step 345.

Returning to the description of step 330, if the result of the comparison is 'Y', or Yes, indicating a match of VIN information, a selection is made either automatically, or manually, that the auxiliary processing module should supplement, or take over processing functionality, for certain applications. The application running on the processor of the audio-visual control unit may be programmed to automatically cede control of all processing functionality to the processor of the auxiliary processing module at step 335. However, preferably, the processor of the audio-visual control unit retains some control over basic processing related to AM/FM, CD, DVD audio, and possibly haptic interface signals received from a touchscreen display device, or from other manual controls, such as buttons, knobs, sliders, biometric recognition devices, etc. which may be coupled with the audio-visual control unit.

In addition to the processor of the audio-visual control unit retaining control of low level functions, it may also generate and present to a user, a graphical user interface on a graphical display device that presents a user with options from which to select a variety of features, functions, and aspects that require more processing capability that the processor of the audio-visual control unit. If a user selects such a feature, function, or aspect, using the graphical user interface, the processor of the auxiliary processing module assumes the processing of one, or more, applications that require high computing capabilities relative to those of the processor of the audio-visual control unit.

After such a selection is made 335, at step 340 the processor of the audio-visual control unit instructs a multiplexer to configure switching so that graphical signals from the auxiliary processing module are routed to a graphical display device rather than signals from the audio-visual control unit's processor being routed to the graphical display device. It will be appreciated that the processor(s) of the audiovisual control unit and the processor(s) of the auxiliary processing module may cooperate and coordinate control with one another so that although the processor of the auxiliary processing module has primary access to the display device coupled to the audio-visual control unit, the processor of the audio-visual control unit can render visual information on the display device whenever a user adjusts the volume, radio station, media disc content, etc. Method 300 ends at step 345.

In an aspect, the auxiliary processing module may send the vehicle VIN and a unique identifier of the auxiliary processing module to the central computer server, or TOC, which typically associates an account's services according to VIN. In other words, a telematics services provider typically associates a level of services that a subscriber has subscribed to with a VIN. The telematics serives provider may also associate a unique identifier of an auxiliary processing module with a VIN. This could prevent, for example, the performing by a given auxiliary processing, module of temporarily deactivated services selected at step 335 even if a VIN match occurs at step 330. Or, if a vehicle is reported stolen, the telematics services provider could deactivate certain services, or enable certain telematics services that are currently unsubscribed, if an auxiliary processing module that is inserted in the vehicle's auxiliary processing module interface satisfied the VIN match query at step 330.

These and many other objects and advantages will be readily apparent to one skilled in the art from the foregoing specification when read in conjunction with the appended drawings. It is to be understood that the embodiments herein illustrated are examples only, and that the scope of the

What is claimed is:

1. A device, comprising:
an auxiliary processing module to:
perform wireless communications, graphics processing, and application processing;
pass signals, via complementary contacts, to an auxiliary processing module interface, connected to an audio-visual control unit of a vehicle, when the auxiliary processing module has been coupled with the auxiliary processing module interface,
the wireless communications, graphics processing, and application processing supplementing processing by the audio-visual control unit when the auxiliary processing module has been selected with a user interface;
receive a vehicle identification number of the vehicle from a communication network of the vehicle;
compare the retrieved vehicle identification number with a previously stored vehicle identification number; and
permit use of features that the auxiliary processing module is configured to perform based on the retrieved vehicle identification number matching the previously stored vehicle identification number.

2. The device of claim 1, further comprising:
processor circuitry that has a performance capability exceeding that of a processor of the audio-visual control unit.

3. The device of claim 1, wherein the auxiliary processing module interface includes an accessible connection slot.

4. The device of claim 1, wherein the auxiliary processing module is further to:
provide, for display, a graphical user interface that presents options for selecting one or more features of the auxiliary processing module.

5. A device, comprising:
an auxiliary processing module to:
perform wireless communications, graphics processing, and application processing;
pass signals, via complementary contacts, to an auxiliary processing module interface connected to an audio-visual control unit of a vehicle when the auxiliary processing module has been coupled with the auxiliary processing module interface,
the wireless communications, graphics processing, and application processing supplementing processing by the audio-visual control unit when the auxiliary processing module is selected using software running on the audio-visual control unit, and
a display device being coupled to the audio-visual control unit;
receive a vehicle identification number of the vehicle from a communication network of the vehicle;
compare the retrieved vehicle identification number with a previously stored vehicle identification number;
permit use of features that the auxiliary processing module is configured to perform based on the retrieved vehicle identification number matching the previously stored vehicle identification number; and
configure a switching means that operates when use of the auxiliary processing module has been selected to couple output from the auxiliary processing module to the display device.

6. The device of claim 5, wherein the auxiliary processing module comprises processor circuitry having a performance capability that exceeds a processing capability of a processor of the audio-visual control unit.

7. The device of claim 5, wherein the auxiliary processing module interface includes a slot.

8. The device of claim 5, wherein a connection of the auxiliary processing module interface and the the audio-visual control unit compose a head unit.

9. The device of claim 5, wherein use of the auxiliary processing module has been selected using a user interface.

10. The device of claim 9 wherein the user interface is generated by software running on the audio-visual control unit.

11. The device of claim 9 wherein the user interface is generated by software running on the auxiliary processing module.

12. A method comprising:
detecting, by an auxiliary processing module, coupling to an auxiliary processing module interface coupled to an audio-visual control unit of a vehicle:
determining, by the auxiliary processing module, that the coupling of the auxiliary processing module to the auxiliary processing module interface is a first coupling:
retrieving, by the auxiliary processing module and from a communications network of the vehicle, a vehicle identification number of the vehicle;
storing the vehicle identification number;
receiving, by the auxiliary processing module and via a user interface, a selection of at least one feature that the auxiliary processing module has been configured to perform,
the user interface being presented by the audio-visual control unit on a graphical display device coupled to the audio-visual control unit; and
configuring, by the auxiliary processing module, switching to enable video graphic signals passing from the auxiliary processing module to the graphical display device.

13. The method of claim 12, further comprising:
causing the auxiliary processing module to wirelessly transmit the vehicle identification number and a unique identifier of the auxiliary processing module to a central computer system.

14. The method of claim 12, further comprising;
retrieving the vehicle identification number from a communications network of the vehicle;
comparing a previously stored vehicle identification number with the retrieved vehicle identification number; and
permitting use of features that the auxiliary processing module is configured to perform based on the retrieved vehicle identification number matching the previously stored vehicle identification number.

15. The method of claim 12, wherein the auxiliary processing module couples to the auxiliary processing module interface via a wireless link.

16. The method of claim 12, further comprising:
providing, for display, a graphical representation related to performing the at least one feature.

17. The method of claim 12, wherein the at least one feature is audio file synchronization.

18. The method of claim 12, wherein the at least one feature is vehicle navigation.

19. The method of claim 12, wherein the at least one feature is e-mail synchronization.

20. The method of claim 12, wherein the at least one feature is gasoline station information.

\* \* \* \* \*